Sept. 13, 1932. N. FORREST 1,877,290

HEAT INSULATING CONTAINER

Filed April 24, 1930

Inventor

NEIL FORREST

By Frank D. Gray

Attorney

Patented Sept. 13, 1932

1,877,290

UNITED STATES PATENT OFFICE

NEIL FORREST, OF LAKEWOOD, OHIO

HEAT INSULATING CONTAINER

Application filed April 24, 1930. Serial No. 446,853.

My invention relates to a heat insulating container whose walls are spaced apart by suitable heat insulating material packed in such space, detachable structure being provided whereby the inner container which comprises integral walls may be inserted readily into the outer casing from below when the bottom of the casing is removed temporarily, and the contents of the inner container may be poured out at the top by conveniently lifting the combined container into discharging position and removing the stopper, such as a cork or other plug, from the inner container whose upper end is designed to extend above the edge of the casing.

It is of especial importance that by properly relating the two spaced parts—the inner container and outer casing, I am enabled to use for the inner container a receptacle more nearly resembling the usual milk bottle having an enlarged rim adjacent its opening, from which the contents may be poured, and to provide integral with the upper end of the outer casing, a pouring lip through which the contents of the bottle may be delivered.

With my novel construction I am able to provide the outer casing with such an attached handle that the contour of the two containers permits secure support of the container as a whole by the handle, and yet secures the inner container against loosening the same by movement thereof toward the lip end of the casing; and by providing the unit with a detachable base having a peripheral flange, the casing is supported in secure vertical position though permitting removal of the inner container through the lower end of the casing. It is an advantage of my construction that no relative rotation of the casing and base is required for the removal of the latter.

It is a further object of my invention to provide my outer casing suitably spaced about the inner container with a heat insulating packing which may be readily filled in from the bottom and packed between the receptacles toward their top ends, and thereafter retaining the packing therein by the same bottom part that serves as the base for the entire unit.

Other objects and advantages will be explained in connection with the following description of parts, recited in the appended claims and illustrated in the accompanying drawing in which,—

Figure 2:
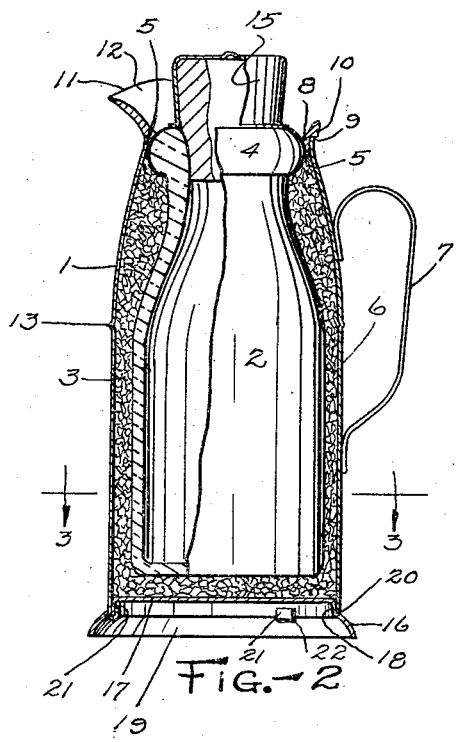
Figure 2 is a vertical section of the outer casing, and a section in part and partial elevation of the inner container.

My outer metal casing 1 and the shorter inner glass container 2 are shown in the drawing as related in my preferred form, as spaced apart, the latter within the former, and tightly held in such spaced position by packing in between the casing and container a heat-insulating filler 3, such as ground cork which will be packed in about the container 2 when the parts are positioned in inverted arrangement. It will be noted that the enlarged rim 4 will be crowded upwardly against the reduced inner edge 5 of the casing 1 which thus prevents the packing 3 from escaping outwardly from between the parts 1 and 2, whatever the position of the combined receptacle.

It is to be further noted that the casing 1 has an integral body 6 to which a suitable handle 7 is permanently attached, and an annular rim or flange 8 having outer notch 9 formed beneath the downwardly-turned shoulder 10, is shaped of proper relative size to the said edge 5 that a downward thrust of the same will force the rim or flange 8 between the enlarged rim 4 and the edge 5 until said shoulder 10 rests upon said edge, and the upper ends of the parts 1 and 2 are tightly and securely held in contiguous position. A portion of said rim 8 is provided with an arc portion 11 forming a pouring lip 12 from which the contents of the container 2 may be readily and efficiently poured from the combined container.

The body 6 of the casing 1 has a bead 13 formed in the integral casing which serves to assist the vertical support of the combined container, aside from the handle 7 attached on a particular side of the double container. The inner container 2 which is usually a glass bottle usually having an enlarged annular rim or bead as shown, will ordinarily be provided with a cork stopper 14 of more than normal length, and protected by a metal coat 15 by which the stopper as a whole may be removed from the bottle within the rim 4, or reinserted therein as needed. This efficient stopper 14 is itself heat-insulating, and therefore efficient.

The casing 6 will rest upon an outwardly flared and separate base 16 which will be provided with an integral flat central supporting plate 17 which will have a reduced rim portion 18 extending upward from the inner edge of the rim 19, outer edges 20 of the casing 6 telescoping about the said rim 18, and spacing the bottom of the container 2 from the portion 17 to receive therein the filling material 3, as shown in the drawing.

Figure 1:
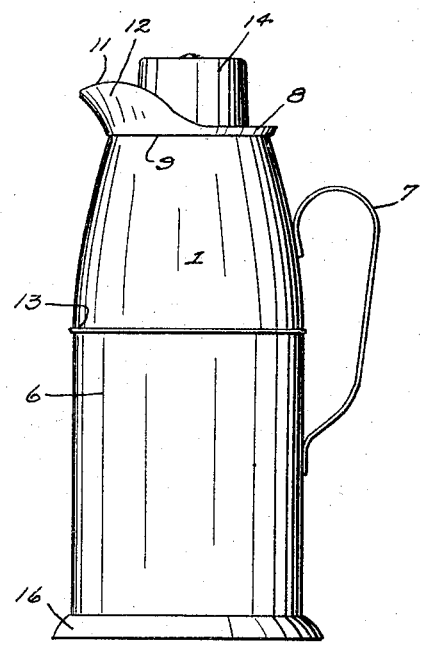
Figure 1 is a side elevation of the entire container.
Figure 3:
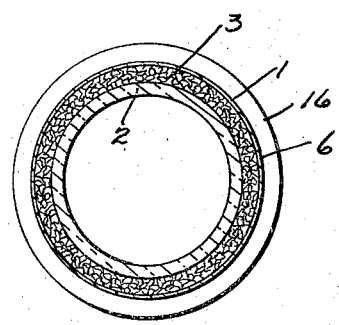
Figure 3 is a transverse sectional view of the container taken in the plane indicated by the line 3—3 of Fig. 2.

Suitable means for securing the base 16 to the casing 1 is provided which may consist of downward metal extensions 21 integral with the outer wall of the casing, and which will be inserted in corresponding slots 22 in the base preferably at the connection between the rims 18 and 19, the said extensions 21 being bent inwardly and upwardly, as shown in Fig. 1, to tightly attach the base in secured position. It is evident that the base 16 can be removed for the purpose of releasing the container 2 either for the purpose of repair, substitution, or replacing the filler 3 with fresh material, and all without relative rotation of parts which is so undesirable.

It will be seen that the inner container 2 may be cleansed by filling with suitable solutions, or by insertion of certain sponge devices for cleansing the inner surface of the receptacle. By so doing, the contents of the container, such as hot coffee, or iced drinks, may not only be retained at substantially the same temperature that it had when the container was filled, and for a long period, but also that the contents may be wholly emptied therefrom, the container cleansed, and refilled many times, without detaching the base 16. Such material for the filler 3 will ordinarily be chosen as an effective heat insulator, that the high temperature of the contents may be retained, or the low temperature of cool liquids remains nearly constant. This condition will be effected while at the same time retaining the great convenience of the assemblage of the effective outer casing and protected inner container.

Considered therefore as a container as a whole, and as an effective double walled insulating container having a suitable granulated heat insulated packing between said walls, the annular rim member or flange 8 having the lip portion 12 integral therewith serves especially as an advantage in not only providing the combined container with a pouring lip, but also serves as a highly novel annulus that is readily fitted in between the upper edge 5 of the casing and the enlarged portion 4 of the inner container, so that the parts are fitted together at their upper ends, though detachable. This novel feature of permitting the inner container to be inserted from below, and fastened in its upper position, is a matter of great value for which the inventor should be protected by claims of adequate scope.

Having thus described my invention, what I claim as new and desire to secure by Letters Patent, is:

1. A heat insulated container comprising a metal outer casing open at both ends, a lip member having an annular flange attached to the upper edge of said casing, an inner container having an annular enlarged upper edge for fitting snugly against the inner surface of said flange, a flared base having a reduced annular central portion adapted to be detachably inserted within the lower opening of the casing, means for detachably securing the base to the casing comprising tongue extensions on one part for entering slots in the other, and heat insulating filling material packed into the space between the casing and container.

2. A heat insulated container comprising an elongated outer metal casing open at both ends, an inner container having an enlarged upper edge, a lip member having an annular flange attached to and positioned within the upper edge of said casing fitting snugly upon the upper edge of the inner container, a flared base fitting telescopically within the lower opening of the casing, a heat insulating stopper for closing the upper end of the container adjacent said lip, the inner container being spaced from the walls of the casing and base, and heat insulating filler material packed into the said space.

3. A heat insulated container comprising a metal outer casing open at both ends, a lip member having an annular flange attached to the upper edge of said casing, an inner container having an enlarged upper edge, the said flange fitting closely between the upper edges of said casing and inner container, a flared base fitting telescopically within the lower opening of the casing, a heat insulating stopper for closing the upper end of the inner container, a portion of said enlarged upper edge serving as a part of the pouring channel between the inner container and said lip member, and means for detachably connecting the said base to the lower end of the casing comprising tongue extensions integral with the casing for entering corresponding slots of said base.

4. A heat insulated combination container comprising an inner container having a reduced neck, a single opening therein, a metal outer casing having open ends through one of which the inner container can be inserted, a detachable base member for securing the bottom end of the casing closed but spaced from the bottom of the inner container, a heat insulating stopper for said container, the latter having an enlarged annular beaded edge, an annular pouring member for fitting tightly upon the upper edge of the casing and at the same time closing the space between the said beaded edge and casing, and heat insulating packing material filled in between the walls of the casing and container both at the bottom and sides.

5. A heat insulated container comprising a metal casing open at both ends, the upper end of said casing converging inwardly and the lower end thereof having a cylindrical opening, a flared base having a reduced central upper portion fitting tightly within the lower end of the casing, annular means seated upon the upper end of the casing for receiving thereagainst the enlarged upper rim of an ordinary milk bottle when the bottom of the latter is spaced from the base, but exposing a portion of the upper surface of said rim to the flow of the contents of said bottle thereover in pouring from the combined container, heat insulating granulated material adapted to be packed into the space between the bottle and casing from below, and means for detachably and non-rotatably connecting the base and the lower end of the casing together.

6. A heat insulated combination container comprising an elongated outer casing open at both ends, annular means having a lip portion seated upon the edge of the upper opening for receiving thereagainst the beaded edge of an ordinary milk bottle when inserted through said lower opening, insulating packing material between the side and bottom walls of the casing and bottle, and detachable base means fitting said lower opening at its lower edge non-rotatably.

In witness whereof I have hereunto set my hand this 18th day of April, A. D. 1930.

NEIL FORREST.